May 16, 1972
N. VON KUTEPOW ET AL
3,663,578
CATALYTIC OXIDATION OF ALKYL-SUBSTITUTED HYDROQUINONES TO THE CORRESPONDING P-BENZOQUINONES

Filed April 1, 1970

INVENTORS:
NIKOLAUS VON KUTEPOW
AUGUST MAGIN
HANS-INGO JOSCHEK
BY

Johnston, Root, O'Keeffe, Keil, Thompson & Shurtleff
ATT'YS

INVENTORS:
NIKOLAUS VON KUTEPOW
AUGUST MAGIN
HANS-INGO JOSCHEK

United States Patent Office 3,663,578
Patented May 16, 1972

3,663,578
CATALYTIC OXIDATION OF ALKYL-SUBSTI-
TUTED HYDROQUINONES TO THE CORRE-
SPONDING P-BENZOQUINONES
Nikolaus von Kutepow, Karlsruhe, August Magin, Mut-
terstadt, and Hans-Ingo Joschek, Mannheim, Germany,
assignors to Badische Anilin- & Soda-Fabrik Aktien-
gesellschaft, Ludwigshafen (Rhine), Germany
Filed Apr. 1, 1970, Ser. No. 24,524
Int. Cl. C07c 49/64
U.S. Cl. 260—396 R         9 Claims

ABSTRACT OF THE DISCLOSURE

Air oxidation of alkyl-substituted hydroquinones in the presence of heavy metal salts as catalysts in a liquid mixed phase consisting of an aqueous phase and an organic phase. The aqueous phase contains dissolved catalyst and additives for setting up a pH below 7, and the organic phase is a selective solvent for the alkyl-substituted p-benzoquinone formed in the oxidation. The process enables 2,3,6-trimethylhydroquinone, an important intermediate in the synthesis of vitamin E, to be separated from mixtures of methyl-substituted hydroquinones.

Figure 1:
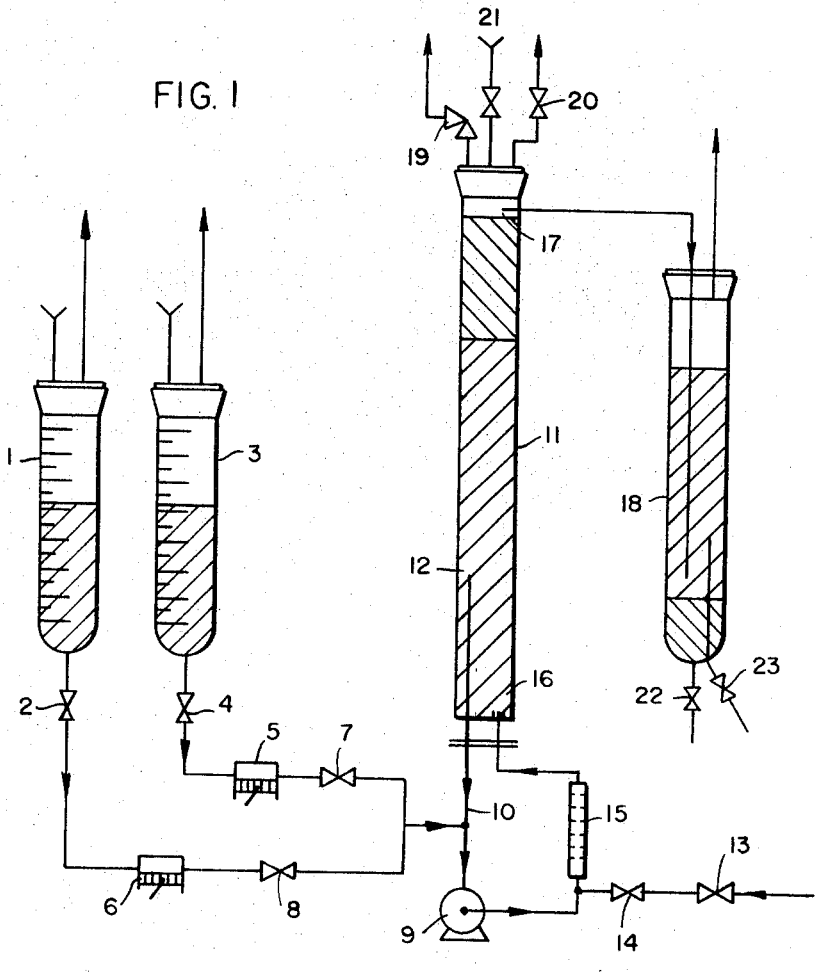

This invention relates to a process for the air oxidation of alkyl-substiuted hydroquinones in the presence of heavy metal salts as catalysts.

It is known that alkyl-substituted dihydroxybenzenes can be oxidized in the presence of heavy metals or their salts as catalysts with oxygen or air at atmospheric or slightly elevated pressure to form the corresponding benzoquinones.

Thus for example 3,5-ditert-butylpyrocatechol can be oxidized to the corresponding o-quinone (3,5-ditert-butyl-benzoquinone) in a weakly alkaline aqueous-alcoholic medium in the presence of heavy metal salts as catalysts with molecular oxygen (Biochemistry, 3, 1308 et seq. (1964)).

It has been found however that alkyl-substituted hydroquinones or mixtures thereof such as are obtained for example in the reaction of propyne, butyne, carbon monoxide and water (for literature see Angew, Chem., 81st year (1969), No. 19, pages 720 to 721) cannot be oxidized by the abovementioned method to the corresponding alkyl-substituted p-benzoquinones or mixtures of the same because undesired quinhydrones form from the starting product and the end product of the oxidation.

There is therefore the problem of inhibiting the said quinhydrone formation in order to obtain the desired alkyl-substituted p-benzoquinones.

This problem has been solved in accordance with this invention by carrying out the oxidation in acid solution and by using a selective organic solvent for the alkyl-substituted p-benzoquinones for removing the alkyl-substituted p-benzoquinones from the reaction zone.

By a combination of the said features it is possible to convert alkyl-substituted hydroquinones or mixtures of the same without difficulty with very good yields of for example more than 95% into the corresponding alkyl-substituted p-benzoquinones or mixtures thereof by carrying out the oxidation using a gas containing oxygen at room or elevated temperature and in the presence of a conventional catalyst in a liquid mixed phase which consists of:

(a) an aqueous phase in which a heavy metal salt has been dissolved at a pH of less than 7 as the catalyst; and
(b) an organic phase which contains a selective organic solvent for reception of the alkyl-substituted p-benzoquinone.

Alkyl-substituted hydroquinones having one to four carbon atoms or mixtures of the same may be used as starting materials for the process according to this invention. These hydroquinones may be substituted by 1 to 4 alkyl groups. It is preferred to use methyl-substituted hydroquinones or mixtures of the same such as are obtained by the said methods (Angew, Chem., loc. cit.). Examples of these are: 2,6-dimethylhydroquinone, 3,6-dimethylhydroquinone, 2,3,6-trimethylhydroquinone and 2,3,5,6-tetramethylhydroquinone.

Gas containing oxygen, particularly air, is suitable as oxidizing agent for the said reaction.

This gas is passed into the reactor at such a pressure that static pressure in the reactor is overcome. It contributes in part to mixing the aqueous phase and the organic phase which contains the selective solvent.

For safety reasons the reaction temperatures for the process according to the invention are chosen so that an explosive mixture with the vapour of the selective organic solvent, for example cyclohexane, is not formed above the mixed phase in the reactor. Explosion limits of 1.3 to 8% by volume (with reference to the cyclohexane content in the mixture) apply for mixtures of cyclohexane and air at room temperature (20° C.).

Oxidation of the alkyl-substituted hydroquinone is therefore generally carried out in the temperature range from 20° to 40° C.

Salts of heavy metals of subgroups I, VII and VIII of the Periodic System of Elements are suitable as catalysts for the oxidation. Water soluble salts of copper, silver, manganese, cobalt and platinum may be referred to in particular, copper salts in an amount of from 3 to 5% by weight with reference to the aqueous phase being preferred.

It is an essential feature of the process according to this invention that the oxidation should be carried out in a mixed phase. This mixed phase consists of an aqueous phase and an organic phase. The aqueous phase contains dissolved catalyst and other additives for setting up the desired pH range.

The organic phase consists of a selective organic solvent for the alkyl-substituted p-benzoquinone formed in the oxidation.

All saturated cyclic hydrocarbons having from six to eight carbon atoms are suitable as selective organic solvents. Examples are methylcyclopentane, monomethylcyclohexane, dimethylcyclohexane, cyclohexane and cyclooctane, cyclohexane having proved to be particularly suitable.

The pH of the aqueous phase is adjusted according to the invention to values below 7, preferably to a pH from 0.5 to 4. The pH range of from 1.0 to 3.0 has proved to be particularly suitable.

Weak organic monocarboxylic acids having 2 or 3 carbon atoms such as acetic acid and propionic acid or a dicarboxylic acid such as succinic acid may be added to the aqueous solution of the catalyst to set up the pH, monocarboxylic acids having proved to be particularly suitable. The content of these additives may amount to 50% by weight or more with reference to the aqueous phase. It is preferred however to use the said weak monocarboxylic or dicarboxylic acids in amounts of from 5 to 20% by weight with reference to the aqueous phase.

The pH of the aqueous phase may however also be set up with buffer substances. An example of such a buffer substance is ammonium chloride which is preferably used in an amount of 3 to 10% by weight with reference to the aqueous phase.

It is advantageous however to add the said weak organic carboxylic acids to set up the pH of the aqueous phase because when ammonium chloride is used it sometimes happens that when the two phases are intensely mixed in the reactor, stable emulsions are formed which cannot be separated by either physical methods (sedimentation) or chemical methods (addition of electrolytes). The formation of such emulsions is not observed when weak organic monocarboxylic or dicarboxylic acids are used.

Provision has to be made during the reaction for efficient mixing of the starting product aqueous and organic phases. This may be achieved for example by using a vibromixer or by recirculating the reaction mixture.

The process enables 2,3,6-trimethylhydroquinone, an important intermediate in the manufacture of vitamin E, to be separated from mixtures of methyl-substituted hydroquinones (obtained by Reppe synthesis) by fractionation of the oxidation product followed by hydrogenation.

The following examples will illustrate the process according to the invention. Two different apparatus are given in which the oxidation of alkyl-substituted hydroquinones are carried out continuously (Example 1) and batchwise (Examples 2, 3, 4 and 5).

EXAMPLE 1

Referring to FIG. 1 of the drawing, cyclohexane is filled into a calibrated supply vessel 1 (diameter 120 mm., length 450 mm., capacity about 5 liters) provided with a funnel, vent pipe and a discharge line capable of being closed by means of a valve 2. A second supply vessel 3 having a discharge line and valve 4 serves for supplying fresh catalyst or catalyst recovered during processing and returned. The two supply vessels are connected through pumps 5 and 6 and stop valves 7 and 8 (on the pressure side of the pumps) to a liquid cycle 10 operated by means of a centrifugal pump 9. The liquid cycle flows through the reactor 11 in which oxidation of the methyl-substituted hydroquinone takes place. The reactor 11 (diameter 120 mm., length up to the overflow, about 1200 mm., capacity up to the overflow about 13 liters) is charged prior to the commencement of the reaction with 150 g. of a mixture of methyl-substituted hydroquinones (Angew. Chem., loc. cit.), about 6 liters of aqueous catalyst solution containing 3.6% of $CuCl_2$ and 10% of acetic acid (pH of the aqueous phase 1.4) and with 4 liters of cyclohexane.

Mixing of the catalyst solution with the cyclohexane in the reactor 11 by means of the liquid cycle 10 is effected by continuously withdrawing reaction mixture by means of pump 9 through a pipe 12 (whose mouth is about 400 mm. above the bottom of the reactor) and forcing it after supplying air through a regulating valve 13 and 14 through a baffle zone 15 back into the bottom of the reactor through a nozzle 16.

The liquid column in the reactor rises up to the opening of the overflow pipe 17 projecting into the reactor owing to the supply of air (350 to 400 liters per hour). Oxidation of the hydroquinone mixture takes place immediately with the supply of fresh air and the mixing of the reaction medium, and only the p-benzoquinones formed dissolve in the cyclohexane.

In spite of the intense mixing, a quiescent zone forms in the upper part of the reactor extending about 30 cm. downward from the overflow pipe 17; this quiescent zone consists of a transparent yellowish solution of p-benzoquinones in cyclohexane.

Supply of cyclohexane at a rate of 2 liters per hour by pumping into the reactor in the manner described is now begun and at the same time an equivalent amount of p-benzoquinone solution in cyclohexane overflows into a collecting and separating vessel 18.

For safety reasons the reactor 11 is provided with a safety valve 19 (set up 0.5 atmosphere gauge). Moreover it is fitted with an offgas line capable of being closed by a valve 20, and a supply pipe with a funnel 21. The collecting vessel 18 is provided with a vent pipe and a let-off valve 22. Catalyst solution collects as a lower layer in the collecting vessel after a time and above this is the solution of p-benzoquinone in cyclohexane which has overflowed from the reactor. In order to promote separation, the overflowing solution from the reaction mixture flows into the collecting vessel 18 at about the middle. Reaction product dissolved in cyclohexane is continuously withdrawn from the collecting vessel 18 through a valve 23. Withdrawal of the said solution is effected through a drain pipe which is at least 10 cm. above the point of supply of the solution from reactor 11. The catalyst solution accumulating in the collecting vessel is withdrawn intermittently through a valve 22 and returned to the supply vessel 3, if necessary replenished with fresh catalyst solution.

After about forty-five minutes, the 150 g. of mixture of methyl-substituted hydroquinones introduced has been oxidized to the corresponding mixture of p-benzoquinones and for the most part withdrawn from the apparatus in the form of a solution in cyclohexane. 150 g. of the same hydroquinone mixture is supplied through funnel 21 to the reactor 11 and reacted as described. This process is again repeated so that a total of 450 g. of the said hydroquinone mixture has been supplied. Then the supply of oxidizing gas and cyclohexane to the reactor is stopped. After separation into two phases has taken place, the solution of p-benzoquinones in cyclohexane from vessel 18 is combined with the solution of p-benzoquinones in cyclohexane still present in the reactor 11 and then distilled. 450 g. of p-benzoquinone mixture is obtained as distillation residue, being equivalent to a yield of 97.5% with reference to the hydroquinone mixture supplied. The cyclohexane obtained by distillation is returned to supply vessel 1.

EXAMPLE 2

Figure 2:
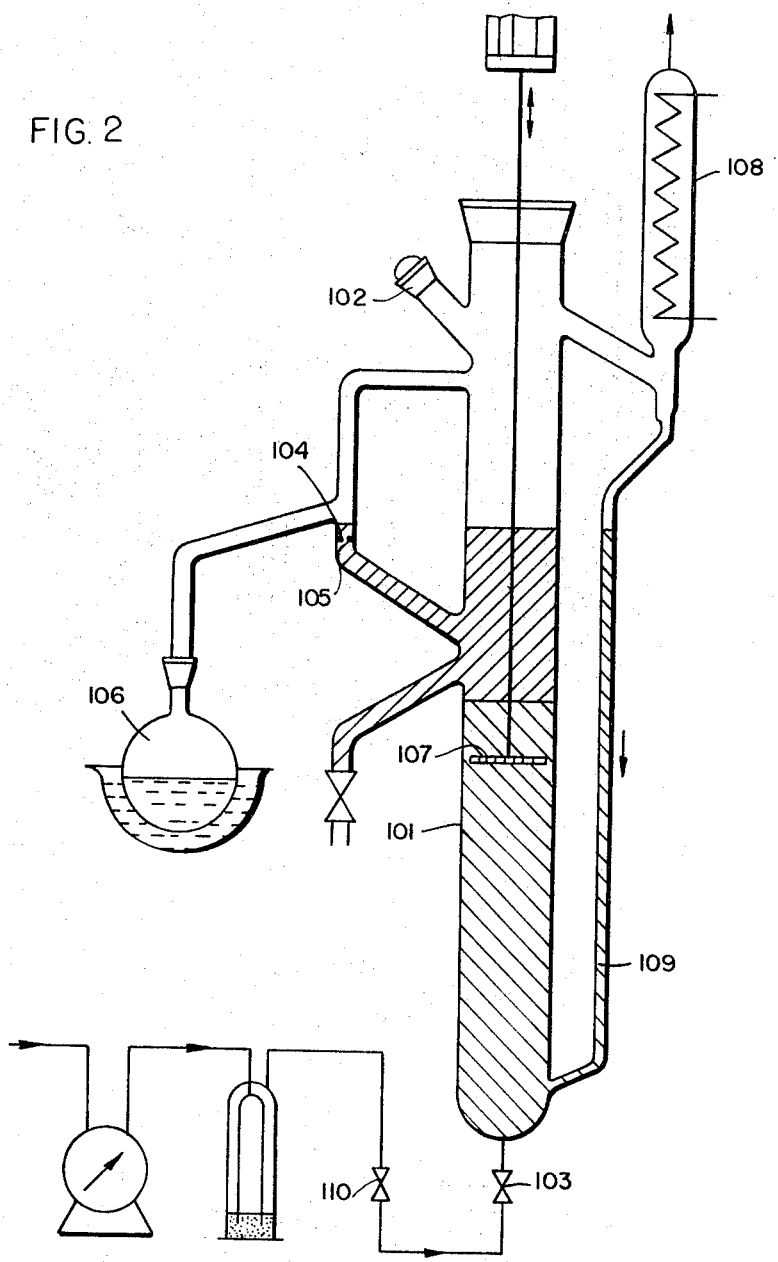

500 ml. of an aqueous catalyst solution containing 3% of copper chloride and 6% of ammonium chloride (pH of the aqueous phase=2.9) is charged into the glass extraction column 101 (see FIG. 2) through the feed pipe 102 with the valve (103) closed, cyclohexane is poured in above the same up to the overflow point 104 immediately above the fritted glass disk 105 and 15 g. of a mixture of methyl-substituted hydroquinones (Angew. Chem., loc. cit.) is added. The overflow tube is connected with a heatable 1-liter flask having a ground glass joint which is half filled with cyclohexane. The overflow tube is also connected at the top with the gas phase of the extraction apparatus. A vibromixer 107 projects down into the extraction apparatus through the upper third of the cyclohexane layer. The cyclohexane in the flask 106 is then heated until it boils, is condensed in the condenser 108 and flows through the connecting pipe 109 into the extraction apparatus. After valves 103 and 110 have been opened, air is passed at the rate of 50 liters per hour into the extraction apparatus and withdrawn through the condenser 108. Efficient mixing of the reaction medium is achieved by the introduction of the air, the ascent of the cyclohexane (of lower specific gravity) in the catalyst solution and the action of the vibromixer. The methyl-substituted hydroquinones are thus oxidized to the corresponding p-benzoquinones and these dissolve in the cyclohexane. A clear yellow zone consisting of a solution of p-benzoquinones in cyclohexane forms at the upper end of the column of liquid outside the effective range of the vibromixer. This solution overflows through the fritted glass disk 105 into flask 106; the cyclohexane distils off as described above and is returned to the extraction apparatus while the p-benzoquinones accumulate in flask 106.

Oxidation is over after about sixty minutes. The cyclohexane containing p-benzoquinones from the flask and from the apparatus is combined and the cyclohexane is distilled off. The residue obtained is 14.7 g. of a mixture of p-benzoquinones which is equivalent to a yield of 97% with reference to the hydroquinone mixture. The catalyst solution does not have to be replaced even after having been used thirty times.

EXAMPLE 3

The procedure of Example 2 is followed but with the difference that 500 ml. of an aqueous catalyst solution containing 5% of copper chloride and 10% of propionic acid is used (pH of the aqueous phase=1.6). The supply of air through the gas meter and washing bottle is carried out at a rate of 9 liters per hour. The duration of the oxidation is 180 minutes. After the cyclohexane has been distilled off, 14.55 g. of quinone mixture is obtained, i.e. a yield of 97% with reference to the hydroquinone mixture.

EXAMPLE 4

The oxidation is carried out as described in Example 2. 500 ml. of aqueous catalyst solution containing 3% of copper chloride and 10% of succinic acid is used. The yield of quinone mixture (14.3 g.) is 95.3% with reference to the hydroquinone mixture.

EXAMPLE 5

The procedure of Example 2 is followed but 500 ml. of an aqueous catalyst solution is used which contains 3% of copper chloride and 50% of acetic acid and which has a pH of 0.69. The duration of the oxidation is one hour. A total of 60 liters of air is passed through. After the cyclohexane has been distilled off, 14.35 g. of quinone mixture is obtained. This is a yield of 95.8% with reference to the hydroquinone mixture.

We claim:

1. In a process for the oxidation of at least one alkyl-substituted hydroquinone to the corresponding p-benzoquinone by reaction with a gas containing oxygen at room or elevated temperature and in the presence of a catalyst in the liquid phase, the improvement which comprises carrying out said oxidation in a mixed two-phase liquid which consists of:
   (a) an aqueous phase in which a water-soluble copper salt has been dissolved as catalyst at a pH of less than 7; and
   (b) an organic phase which contains, as a selective organic solvent for the reception of alkyl-substituted p-benzoquinones, a saturated cyclic hydrocarbon of 6 to 8 carbon atoms.

2. A process as claimed in claim 1 wherein the aqueous phase (a) has a pH of from 0.5 to 4.

3. A process as claimed in claim 1 wherein the pH of the aqueous phase (a) is set up by a weak organic monocarboxylic or dicarboxylic acid or by ammonium chloride as a buffer substance.

4. A process as claimed in claim 1 wherein the pH of the aqueous phase (a) is set up by a weak organic monocarboxylic acid of 2 or 3 carbon atoms.

5. A process as claimed in claim 1 wherein cyclohexane is used as selective organic solvent in the organic phase (b).

6. A process as claimed in claim 1 carried out at a temperature of from 20° to 40° C.

7. A process as claimed in claim 1 wherein the aqueous phase (a) has a pH of from 0.5 to 4.

8. A process as claimed in claim 1 wherein the reactant being oxidized is a hydoquinone substituted by 1 to 4 methyl groups.

9. A process as claimed in claim 8 wherein the selective organic solvent of the organic phase (b) is cyclohexane.

References Cited
UNITED STATES PATENTS

| | | | |
|---|---|---|---|
| 3,479,374 | 11/1969 | Hargis et al. | 260—396 |
| 3,549,670 | 12/1970 | Spousta | 260—396 |
| 3,576,016 | 4/1971 | Finkbiner | 260—396 |

LORRAINE A. WEINBERGER, Primary Examiner

V. GARNER, Assistant Examiner

PO-1050
(5/69)

UNITED STATES PATENT OFFICE
CERTIFICATE OF CORRECTION

Patent No. 3,663,578          Dated May 16, 1972

Inventor(s) Nikolaus von Kutepow et al

It is certified that error appears in the above-identified patent and that said Letters Patent are hereby corrected as shown below:

Column 1, line 9, insert -- Claims priority, application Germany, Oct. 18, 1969, P 19 52 652.4 --; line 44, "Angew," should read -- Angew. --.

Column 2, line 7, "Angew," should read -- Angew. --.

Column 6, line 22, claim 7, "0.5 to 4" should read -- 1 to 3 --.

Signed and sealed this 9th day of January 1973.

(SEAL)
Attest:

EDWARD M. FLETCHER, JR.          ROBERT GOTTSCHALK
Attesting Officer                Commissioner of Patents